United States Patent [19]

Webster

[11] 3,774,122

[45] Nov. 20, 1973

[54] BRIDGED CYANINE DYE LASERS

[75] Inventor: Frank G. Webster, Rochester, N.Y.

[73] Assignee: Eastman Kodak Company, Rochester, N.Y.

[22] Filed: Oct. 6, 1972

[21] Appl. No.: 295,773

[52] U.S. Cl. .............................. 331/94.5, 330/4.3
[51] Int. Cl. ............................................. H01s 3/20
[58] Field of Search ..................... 331/94.5; 330/4.3

[56] References Cited
OTHER PUBLICATIONS

Sorokin et al., Stimulated Emission Observed from an Organic Dye, Chloro-aluminum Phthalocyanine, IBM Journal (March 1966), pp. 162 and 163.

Spaeth et al., Stimulated Emission from Polymethine Dyes, Appl. Phys. Letters, Vol. 9, No. 5 (Sept. 1, 1966), pp. 179–181.

Schafer et al., New Dye Lasers Covering the Visible Spectrum, Physics Letters, Vol. 24A, No. 5 (Feb. 27, 1967), pp. 280–281.

Primary Examiner—William L. Sikes
Attorney—Robert W. Hampton et al.

[57] ABSTRACT

Bridged enamine and allopolar cyanine dyes are useful as laser dyes. These dyes are used in solution with a non-interfering solvent to form lasing media useful in dye lasers. When excited, these dyes typically emit in the near infrared region of the spectrum.

10 Claims, No Drawings

BRIDGED CYANINE DYE LASERS

BACKGROUND OF THE INVENTION

1. Field of Invention

This invention relates to lasers and more particularly to the use of a certain class of dyes as lasing media for organic dye lasers.

2. Description of the Prior Art

Many of the materials discovered thus far which are capable of acting as lasing media have been in the solid or gaseous state. Solid lasers typically suffer from such disadvantages as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prsim.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al, IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S_0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fall entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one and and out of the cavity to constitute the laser output light pulse or the laser beam.

Organic dye lasers have been devised for use in a variety of applications. By selecting the appropriate dye and solvent, a wavelength of lasing can be obtained in virtually any portion of the visible spectrum. However, there has been a near complete lack of success in obtaining dye laser emission in the near infrared portion of the spectrum. Accordingly, there is a need in the art for a class of dyes which lase in and around the near infrared region of the spectrum.

SUMMARY OF THE INVENTION

I have found that a class of bridged enamine and allopolar cyanine dyes are useful as lasing media. This class of dyes includes various individual dyes which, when suitably excited, lase in the near infrared region of the spectrum. Minor modifications of the structures of these dyes allow one to prepare lasing composition which will emit at selected wavelengths in and around the near infrared region of the spectrum.

DESCRIPTION OF PREFERRED EMBODIMENTS

The objects of the present invention are obtained through the use, with dye lasers having a reservoir means containing a laser dye solution and a pumping energy source capable of producing stimulated emission of the solution which comprises a lasing concentration of dye in a non-interfering solid or liquid host solvent (i.e., one that does not inhibit stimulated emission), of a bridged enamine or allopolar cyanine dye.

The dyes useful in this invention can be represented by the structural formula:

I.

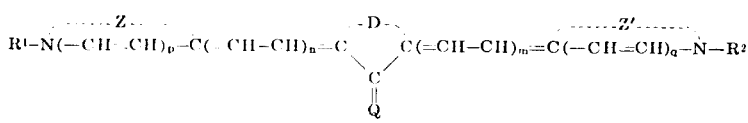

wherein:

$n$ and $m$ each represent a positive integer having a value of 1 or 2 with the sum of $n + m$ not exceeding 3;

$p$ and $q$ each represent an integer having a value of 0 or 1;

$R^1$ and $R^2$ each represent an alkyl radical having 1 to about 10 and preferably about 1 to about 4 carbon atoms and including substituted alkyl radicals having such substituents as sulfo, carboxy, dialkylamino (having 1 to about 4 carbon atoms in the alkyl moieties), hydroxy, alkoxy (having 1 to about 4 carbon atoms in the alkyl moiety), acyloxy, alkoxycarbonyl (having 1 to about 4 carbon atoms in the alkyl moiety) and an aryl radical; and alkenyl radical having 2 to about 10 and preferably 2 to about 4 carbon atoms and including substituted alkenyl radicals; a monocyclic aryl radical including substituted monocyclic aryl radicals, e.g., phenyl, halophenyl, (chloro, bromo, etc), alkylphenyl (having 1 to about 4 carbon atoms in the alkyl moiety) alkoxyphenyl (having 1 to about 4 carbon atoms in the alkyl moiety), hydroxyphenyl, etc; and an ethylene or trimethylene radical attached to the moiety Z or Z', respectively, to form a 5- or 6- membered fused heterocyclic ring, e.g., as in a 3,4-trimethylenenaphtho[2,3-d]thiazolium nucleus of the structure:

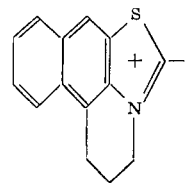

Z and Z' each represent the non-metallic atoms necessary to complete a heterocyclic nucleus containing from 5 to 6 atoms in the heterocyclic ring, such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dimethylbenzothiazole, 5-hydroxybenzothiazole, 6-hydroxybenzothiazole, etc), a naphthothiazole nucleus (e.g., naphtho[1,2-d]thiazole, naphtho[2,1-d]thiazole, naphtho[2,3-d]thiazole, 5-methoxynaphtho[2,1-d]thiazole, 5-ethoxynaphtho[2,1-d]thiazole, 8-methoxynaphtho[1,2-d]thiazole, 7-methoxynaphtho[1,2-d]thiazole, etc.), a thianaphtheno-7',6',4,5-thiazole nucleus (e.g., 4' -methoxy-thianaphtheno-7',6',4,5-thiazole, etc), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc), a benzoxazole nucleus (e.g., benzoxazole, 5-chlorobenzoxazole, 5-methylbenzoxazole, 5phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc), a naphthoxazole nucleus (e.g., naphtho[1,2-d]oxazole, naphtho[2,1-d]oxazole, naphtho[2,3-d]oxazole, etc), a thiazoline nucleus (e.g., thiazoline, 4-methylthiazoline, etc), an imidazoquinoline nucleus (e.g., 1H-imidazo[4,5-b]quinoline etc), a benz[e]indole nucleus (e.g., 1,1'-dimethylbenz[e]indole,etc), a benzimidazole nucleus (e.g., 1,3-diethylbenzimidazole, 1-ethyl-3-phenylbenzimidazole, etc), a naphthimidazole nucleus (e.g., 1H-naphth[2,3-d]imidazole, etc), a 3,3-dialkylinodolenine nucleus (e.g., 3,3-dimethylindolenine, 3,3,5- trimethylindolenine, 3,3,7-trimethylindolenine, etc), a 2-pyridine nucleus (e.g., pyridine, 5-methylpyridine, etc), a 4-pyridine nucleus (e.g., pyridine, etc), an imidazo[4,5-b]quinoxaline nucleus (e.g., 1,3-dialkylimidazo[4,5-b]quinoxaline such as 1,3-diethylimidazo[4,5-b]quinoxaline, 6-chloro-1,3-diethylimidazo[4,5-b]quinoxaline, etc. 1,3-dialkenylimidazo[4,5-b]quinoxaline such as 1,3-diallylimidazo[4,5-b]quinoxaline, 6-chloro-1,3-diallylimidazo[4,5 -b]quinoxaline, etc. 1,3-diarylimidazo[4,5-b]quinoxaline such as 6,7-dichloro-1,3-diphenylimidazo[4,5-b]quinoxaline, 1,3-diphenylimidazo[4,5-b]quinoxaline, 6-chloro-1,3-diphenylimidazo[4,5-b]quinoxaline, 1,3-bis(p-chlorophenyl)imidazo[4,5-b]quinoxaline), etc;

D represents a divalent unsaturated radical selected from the group consisting of ethylene, trimethylene and o-phenylene;

Q represents (1) a salt form of a substituted iminium radical having the formula:

II.

wherein:

$R^3$ and $R^4$ when taken separately each represent an alkyl radical (including cycloalkyl radicals) having 1 to about 6 and preferably about 1 to about 4 carbon atoms and including substituted alkyl radicals having such substituents as sulfo, carboxy, dialkylamino (having 1 to about 4 carbon atoms in the alkyl moieties), hydroxy, alkoxy (having 1 to about 4 carbon atoms in the alkyl moiety), acyloxy, alkoxycarbonyl (having 1 to about 4 carbon atoms in the alkyl moiety) and an aryl radical; an alkenyl radical having 2 to about 8 and preferably 3 to about 6 carbon atoms and including substituted alkenyl radicals; a monocyclic aryl radical including substituted monocyclic aryl radicals; e.g., phenyl, halophenyl, (chloro, bromo, etc), alkylphenyl (having 1 to about 4 carbon atoms in the alkyl moiety) alkoxyphenyl (having 1 to about 4 carbon atoms in the alkyl moiety), hydroxyphenyl, etc; and when taken together with the nitrogen atom to which they are attached $R^3$ and $R^4$ represent the non-metallic atoms necessary to complete a nitrogen-containing heterocyclic nucleus having from 5 to 6 atoms in the heterocyclic ring including such heterocyclic nuclei having a second hetero atom selected from nitrogen and oxygen in the heterocyclic ring (when said second hetero atom is nitrogen it can be substituted with an alkyl radical as defined above for $R^3$ and $R^4$) as well as such heterocyclic nuclei having one or more carbocyclic rings fused to said heterocyclic ring, representative heterocyclic nuclei include morpholine, pyrrolidine, pyrroline, piperazine, piperidine, indoline, tetrahydroquinoline, tetrahydroisoquinoline and the like; and $X^-$ represents an acid anion such as chloride, bromide, iodide, thiocyanate, perchlorate, p-toluenesulfonate, tetrafluoroborate, etc; or 2. a ketomethylene radical having the structure:

III.

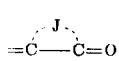

wherein J represents the non-metallic atoms necessary to complete a 5- or 6-membered ring of the type used in merocyanine dyes and typically contains at least one heteroatom selected from nitrogen, oxygen, sulfur or selenium. Exemplary hetero cyclic nuclei of the type used in merocyanine dyes and as represented by Formula III above, include an isoxazolinone nucleus (e.g., 3-phenyl-2-isoxazolin-5-one, 3-methyl-2-isoxazolin-5-one, etc), an oxindole nucleus (e.g., 1-alkyl-2,3-dihydro-2-oxindoles, etc), a 2,4,6-triketohexahydropyrimidine nucleus (e.g., barbituric acid or 2-thiobarbituric acid, as well as their 1-alkyl (e.g., 1-methyl,1-ethyl, 1-n-propyl, 1-n-heptyl, etc), or 1,3-dialkyl (e.g., 1,3-dimethyl, 1,3-diethyl, 1,3-di-n-propyl, 1,3-diisopropyl, 1,3-dicyclohexyl, 1,3-di(2-methoxyethyl),1,3-di(2-methoxyethyl),1,3-di(dialkylaminoalkyl), 1-alkyl-3-(2-morpholinoalkyl), etc), or 1,3-diaryl (e.g., 1,3-diphenyl, 1,3-di(4-chlorophenyl), 1,3-di(4-ethoxycarbonylphenyl), 1,3-di(dialkylaminophenyl), etc), or 1-aryl (e.g., 1-phenyl, 1-p-chlorophenyl, 1-p-ethoxycarbonylphenyl, etc), or 1-alkyl-3-aryl (e.g., 1-ethyl-3-phenyl, 1-(n-heptyl-3-phenyl), etc) derivatives, a 2(3H)-imidazo[1,2-a]pyridone nucleus; a 5,7-dioxo-6,7-dihydro-5-thiazolo[3,2-a]pyrimidine nucleus (e.g., 5,7-dioxo-3-phenyl-6,7-dihydro-5-thiazolo[3,2-a]pyrimidine nucleus), a 2-thio-2,4-oxazolidinedione nucleus (i.e., a 2-thio-2,4-(3H,5H)-oxazoledione nucleus) (e.g., 3-ethyl-2-thio-2,4-oxazolidinedione, etc), a thianaphthenone nucleus (e.g., 3(2H)-thianaphthenone, 3(2H)-thianaphthenone-1,1-dioxide, etc), a 2-thio-2,5-thiazolidinedione nucleus (i.e., a 2-thio-2,5-(3H,4H)-thiazoledione nucleus) (e.g., 3-ethyl-2-thio-2,5-(3H,4H)-thiazolidinedione, etc), a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc), a thiazolidinone nucleus (e.g., 4-thiazolidinone, 3-ethyl-4-thiazolidinone, 3-phenyl-4-thiazolidinone, 3-α-naphthyl-4-thiazolidinone, etc), a 4-thiazolinone nucleus (e.g., 2ethylmercapto-5-thiazolin-4-one, 2-alkylphenylamino-5-thiazolin-4-ones, 2-diphenylamino-5-thiazolinone-4-one, etc), a 2-imino-2-oxazolin-4-one (i.e., pseudohydantoin) nucleus, a 2,4-imidazolidinedione (hydantoin) nucleus (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4l -imidazolidinedione, 1-ethyl-3-α-naphthyl-2,4-imidazolidinedione, 1,3-diphenyl-2,4-imidazolidinedione, etc), a 1,3-indanedione nucleus, a dione or tetrone nucleus (e.g., 1,3-dioxane-4,6-dione, 2H-pyran, 2,4,5,7-(1H,3H,6H)tetrone, etc), a 2-imidazolin-5-one nucleus (e.g., (2-n-propylmercapto-2-imidazolin-5-one, etc), etc. Especially useful are nuclei wherein J represents the non-metallic atoms necessary to complete a 5- or 6-membered heterocyclic ring having 2 hetero atoms at least one of which is nitrogen and the other is selected from nitrogen, oxygen or sulfur.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-6}$ molar are employed, with solutions of from $10^{-2}$ to $10^{-5}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from 1 to about 6 carbon atoms and preferably from 2 to about 4 carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from 1 to about 4 carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, and entitled LASER MEDIA CONTAINING FLUORINATED ALCOHOLS, also heterocyclic compounds having a nitrogen heteroatom (e.g., pyridine, 2,6-dimethylpyridine, etc), and lower alkyl ketones such as dimethylketone. Additional useful solvents include alkyl substituted solvents such as dimethylsulfoxide, dimethylacetamide, dimethylformamide and the like as well as deuterated counterparts of various solvents such as those described above. Of course, combinations of liquids can be used as can other solvents known to be useful in the dye laser art. For example, solid host solvents can be used to form solid solutions of the dye. Acrylic or methacrylic polymers such as polymethylmethacrylate are useful for this purpose. Gelatin is another useful vehicle for lasing dyes. See O. J. Peterson and B.B. Snavely, *App. Phys. Let.*, Vol, 12, p. 238, 1968; B. H. Soffer and B. B. McFarland, *App. Phys. Let.*, Vol. 12, 1967; H. Kogelnick et al., App. Phys. Let., Vol. 16, p. 499, 1970.

The following examples are included for a further understanding of the invention. Unless otherwise stated, the excitation source in the following examples is an electric arc discharge occurring in a quartz discharge tube, approximately 3 mm ID and 15 cm. long with the electrodes located at either end. Energy for the excitation source is stored by a Cornell Dubilier 1 μf fast discharge capacitor. The discharge is effected by applying an electric field between the two electrodes of about 1 kilovolt/cm and reducing the air pressure in the tube until spontaneous breakdown of the air occurs within the tube. The lasing media is contained in a dye cell which is another quartz tube about 3 mm ID and about 14 cm. in length having high optical quality windows sealing both ends. This dye cell is mounted adjacent and parallel the discharge tube. Both the cell and the discharge tube are optically coupled by virtue of their substantially axial location within a cylindrical diffuse reflecting cavity. The resultant resonant optical cavity is bounded by two plane mirrors separated approximately 40 cm. and aligned so that light reflected perpendicularly therefrom passes back along the longitudinal axis of the dye cell. The laser output which emerges from the resonant optical cavity is directed toward a spectrograph to measure the wavelength. Unless otherwise indicated, the dye is dissolved in dimethyl sulfoxide at a concentration of about $10^{-4}$ molar.

EXAMPLE 1

Various dyes are individually tested in the laser device described above. The name and the wavelength of lasing of each dye are recorded below.

| No. | Dye | Wavelength (nm) |
|---|---|---|
| 1 | 4{-2,5-di[(3-ethyl-2-benzothiazolinylidene)ethylidene]-cyclopentylidene}-1,2-diphenyl-3,5-pyrazolidinedione | 940 |
| 2 | 3,3'-diethyl-10,12-ethylene-11-morpholinothiatricarbocyanine iodide | 875 |
| 3 | 3,3'-di(3-acetoxypropyl)-11-diphenylamino-10,12-ethylene-5,6,5',6'-dibenzothiatricarbocyanine perchlorate | 960 |
| 4 | 11-(4-ethoxycarbonylpiperidino)-3,3'-diethyl-10,12-ethylene-4,5,4',5'-dibenzothiatricarbocyanine perchlorate | 888 |
| 5 | 3,3'-diethyl-10,12-ethylene-11-(N-methylanilino)-4,5,4',5'-dibenzothiatricarbocyanine perchlorate | lasing occurred but wavelength not measured. |
| 6 | 3,3'-diethyl-10,12-ethylene-11-(1-indolinyl)-4,5,4',5'-dibenzothiatricarbocyanine perchlorate | lasing wavelength not measured but appeared to be about 930. |

EXAMPLE 2

Dye 3 of Example 1 is tested as above using completely deuterated dimethyl sulfoxide. Lasing occurs but wavelength was not measured.

For purposes of this invention, the term "near infrared" has reference to radiation having a wavelength in the range of about 700 nm to about 1μ.

The dyes useful in this invention can be prepared by the general condensation techniques described in Brooker et al U.S. Pat. No. 2,955,939, issued Oct. 11, 1960 and Fumia U.S. Pat. No. 3,482,978, issued Dec. 9, 1969.

The invention has been described in detail with particular reference to certain preferred embodiments thereof, but it will be understood that variations and modifications can be effected within the spirit and scope of the invention.

We claim:

1. A dye laser comprising a laser dye solution and a pumping energy source operably coupled therewith and capable of producing stimulated emission of the dye solution, said dye solution comprising a lasing concentration, in a non-interfering solvent, of a dye having the formula as follows:

I.

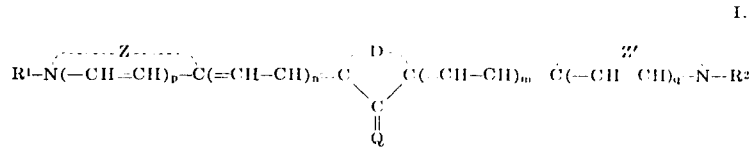

wherein:

n and m each represent a positive integer having a value of 1 or 2 with the sum of n and m not exceeding 3;

p and q each represent an integer having a value of 0 or 1;

$R^1$ and $R^2$ each represent a member selected from the group consisting of an alkyl radical, an alkenyl radical, a monocyclic aryl radical and an ethylene or trimethylene radical attached to the moiety Z or Z', respectively, to form a 5- or 6-membered fused heterocyclic ring;

Z and Z' each represent the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a naphthimidazole nucleus, a 3,3-dialkylindolenine nucleus, a 2-pyridine nucleus, a 4-pyridine nucleus and an imidazo[4,5-b]quinoxaline nucleus;

D represents a divalent unsaturated radical selected from the group consisting of ethylene, trimethylene and o-phenylene;

Q represents (1) a substituted iminium salt having the formula:

II. 

wherein $R^3$ and $R^4$ when taken separately each represent an alkyl radical, an alkenyl radical, a monocyclic aryl radical, and when taken together with the nitrogen atom to which they are attached, $R^3$ and $R^4$ represent the non-metallic atoms necessary to complete a nitrogen-containing heterocyclic nucleus having from 5 to 6 atoms in the heterocyclic ring; and $X^-$ represents an anion; or 2. a ketomethylene radical having the formula:

III. 

wherein J represents the non-metallic atoms necessary to complete a 5- or 6-membered nucleus of the type used in merocyanine dyes.

2. The invention as described in claim 1 wherein said dye is present in a concentration of about $10^{-2}$ to $10^{-5}$ molar.

3. The invention as described in claim 1 wherein J represents the atoms necessary to complete a 5- or 6-membered heterocyclic ring having 2 hetero atoms at least one of which is nitrogen and the other is selected from nitrogen, oxygen or sulfur.

4. A method of producing coherent laser emission in the operation of a dye laser in the wavelength range of from about 700 nm to about 1μ comprising the steps of placing in an optically resonant cavity and optically pumping a dye solution containing between about $10^{-2}$ to about $10^{-5}$ molar concentration of a lasing dye in a non-interfering solvent, said dye having a formula as follows:

I.

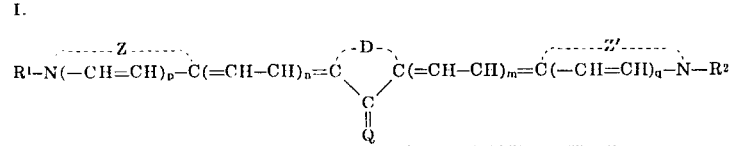

wherein:

n and m each represent a positive integer having a value of 1 or 2 with the sum of n and m not exceeding 3;

p and q each represent an integer having a value of 0 or 1;

$R^1$ and $R^2$ each represent a member selected from the group consisting of an alkyl radical, an alkenyl radical, a monocyclic aryl radical and an ethylene or trimethylene radical attached to the moiety Z or Z', respectively, to form a 5- or 6-membered fuse heterocyclic ring;

Z and Z' each represent the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a naphthimidazole nucleus, a 3,3-dialkylinodolenine nucleus, a 2-pyridine nucleus, a 4-pyridine nucleus and an imidazo[4,5-b]quinoxaline nucleus;

D represents a divalent unsaturated radical selected from the group consisting of ethylene, trimethylene and o-phenylene;

Q represents (1) a substituted iminium salt having the formula:

 II.

wherein $R^3$ and $R^4$ when taken separately each represent an alkyl radical, an alkenyl radical, a monocyclic aryl radical, and when taken together with the nitrogen atom to which they are attached, $R^3$ and $R^4$ represent the non-metallic atoms necessary to complete a nitrogen-containing heterocyclic nucleus having from 5 to 6 atoms in the heterocyclic ring; and $X^-$ represents an anion; or 2. a ketomethylene radical having the formual:

 III.

wherein J represents the non-metallic atoms necessary to complete a 5- or 6-membered nucleus of the type used in merocyanine dyes.

5. The method as described in claim 4 wherein J represents the atoms necessary to complete a 5- or 6-membered heterocyclic ring having 2 hetero atoms at least one of which is nitrogen and the other is selected from nitrogen, oxygen or sulfur.

6. A method of producing coherent laser emission in the operation of a dye laser in the wavelength range of from about 700 nm to about 1μ comprising the steps of placing in an optically resonant cavity and optically pumping a dye solution containing between about $10^{-2}$ to about $10^{-5}$ molar concentration of a lasing dye in a non-interfering solvent, said dye having a formula as follows:

I.

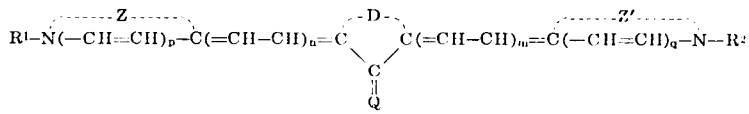

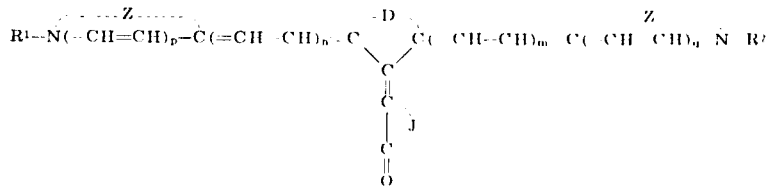

wherein:
- n and m each represent a positive integer having a value of 1 or 2 with the sum of n and m not exceeding 3;
- p and q each represent an integer having a value of 0 or 1;
- $R^1$ and $R^2$ each represent a member selected from the group consisting of an alkyl radical, an alkenyl radical, a monocyclic aryl radical and an ethylene or trimethylene radical attached to the moiety Z or Z', respectively, to form a 5- or 6-membered fused heterocyclic ring;
- Z and Z' each represent the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a naphthimidazole nucleus, a 3,3-dialkylinodolenine nucleus, a 2-pyridine nucleus, a 4-pyridine nucleus and an imidazo[4,5-b]quinoxaline nucleus;
- D represents a divalent unsaturated radical selected from the group consisting of ethylene, trimethylene and 0-phenylene;
- $R^3$ and $R^4$ when taken separately each represent an alkyl radical having 1 to bout 6 carbon atoms, an alkenyl radical having 2 to about 8 carbon atoms, a monocyclic aryl radical and when taken together with the nitrogen atom to which they are attached, represent the non-metallic atoms necessary to complete a nitrogen-containing heterocyclic nucleus having 5 to 6 atoms in the heterocyclic ring; and
- $X^-$ represents an anion.

7. The invention as described in claim 6 wherein $R^3$ and $R^4$ when taken together with the nitrogen atom to which they are attached represent the atoms necessary to complete a nucleus selected from the group consisting of indoline, iso-quinoline, morpholine, piperazine, piperidine, pyrrolidine, pyrroline and quinoline.

8. A method of producing coherent laser emission in the operation of a dye laser in the wavelength range of from about 700 nm to about 1μ comprising the steps of placing in an optically resonant cavity and optically pumping a dye solution containing between about $10^{-2}$ to about $10^{16.5}$ molar concentration of a lasing dye in a non-interfering solvent, said dye having a formula as follows:

wherein:
- n and m each represent a positive integer having a value of 1 or 2 with the sum of n and m not exceeding 3;
- p nd q each represent an integer having a value of 0 or 1;
- $R^1$ and $R^2$ each represent a member selected from the group consisting of an alkyl radical, an alkenyl radical, a monocyclic aryl radical and an ethylene or trimethylene radical attached to the moiety Z or Z', respectively, to form a 5- or 6-membered fused heterocyclic ring;
- Z and Z' each represent the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz[e]indole nucleus, a benzimidazole nucleus, a naphthimidazole nucleus, a 3,3-dialkylinodolenine nucleus, a 2-pyridine nucleus, a 4-pyridine nucleus and an imidazo[4,5-b]quinoxaline nucleus;
- D represents a divalent unsaturated radical selected from the group consisting of ethylene, trimethylene and o-phenylene; and
- J represents the non-metallic atoms necessary to complete a 5- or 6-membered nucleus of the type used in merocyanine dyes.

9. The invention as described in claim 8 wherein J represents the atoms necessary to complete a 5- or 6-membered heterocyclic ring having 2 hetero atoms at least one of which is nitrogen and the other is selected from nitrogen, oxygen or sulfur.

10. The invention as described in claim 4 wherein said dye is selected from the group consisting of 4 {-2,5di-[(3-ethyl-2-benzothiazolinylidene)ethylidene]cyclopentylidene {-1,2-diphenyl-3,5-pyrazolidinedione, 3,3°-diethyl-10,12-ethylene-11-morpholinothiatricarbocyanine iodide, 3,3'-di(3Acetoxypropyl)11-diphenylamino-10,12-ethylene-5,6,5',6'-dibenzothiatricarbocyanine perchlorate, 11-(4-ethoxycarbonylpiperidino)-3,3'-diethyl-10,12-ethylene-4,5,4',5'-dibenzothiatricarbocyanine perchlorate, 3,3'-diethyl-10,12-ethylene-11-(N-methylanilino)-4,54',5'-dibenzothiatricarbocyanine perchlorate and 3,3'-diethyl-10,12-ethylene-11-(1-indolinyl)-4,5,4',5'-dibenzothiatricarbocyanine perchlorate.

\* \* \* \* \*